US012341271B2

(12) United States Patent
Watson

(10) Patent No.: US 12,341,271 B2
(45) Date of Patent: Jun. 24, 2025

(54) DIPOLE ANTENNA WITH LOW CROSS SECTIONAL AREA

(71) Applicant: Communication Components Antenna Inc., Kanata (CA)

(72) Inventor: Paul Robert Watson, Kanata (CA)

(73) Assignee: Communication Components Antenna Inc., Kanata (CA)

( * ) Notice: Subject to any disclaimer, the term of this patent is extended or adjusted under 35 U.S.C. 154(b) by 286 days.

(21) Appl. No.: 18/119,747

(22) Filed: Mar. 9, 2023

(65) Prior Publication Data

US 2024/0305000 A1 Sep. 12, 2024

(51) Int. Cl.
*H01Q 9/06* (2006.01)
*H01Q 21/30* (2006.01)

(52) U.S. Cl.
CPC ............. *H01Q 9/065* (2013.01); *H01Q 21/30* (2013.01)

(58) Field of Classification Search
CPC ........ H01Q 1/246; H01Q 5/378; H01Q 9/065; H01Q 9/285; H01Q 21/26; H01Q 21/30
See application file for complete search history.

(56) References Cited

U.S. PATENT DOCUMENTS

2019/0173186 A1* 6/2019 Farzaneh ............... H01Q 21/26
2024/0204423 A1* 6/2024 Li .......................... H01Q 1/523
2024/0339757 A1* 10/2024 Zhu .......................... H01Q 5/42

FOREIGN PATENT DOCUMENTS

CN 106450751 A * 2/2017
WO WO-2012102576 A2 * 8/2012 ........... H01Q 21/062

* cited by examiner

*Primary Examiner* — Raymond R Chai
(74) *Attorney, Agent, or Firm* — Sofer & Haroun, LLP

(57) ABSTRACT

In a dipole antenna, a capacitive coupling element is introduced in the form of a conductive strip and is placed in parallel with the dipole conductive strip of the dipole arm. To that end, the conductive strip of the capacitive element is formed on a first copper layer of the PCB in parallel to an extended conductive strip of a dipole arm, that is also disposed on the first copper layer of the PCB. The conductive strip of the capacitive element extends horizontally from the center of the dipole arm in an equal distant on each side. A capacitive plate is placed on the second copper layer of the PCB on the opposite side of the first copper layer and is coupled to the conductive strip of the capacitive element via a plated through hole. The capacitive plate placed on the second copper layer extends downwardly so that a portion of it overlaps with the dipole conductive strip located on the first copper layer forming the capacitance coupling element.

20 Claims, 25 Drawing Sheets

DIPOLE ANTENNA WITH LOW CROSS SECTIONAL AREA

FIELD OF THE INVENTION

The present arrangement relates to a capacitive coupling arrangement for the arms of a dipole antenna. More particularly, the present arrangement relates to a vertically oriented capacitive coupling arrangement for the arms of a dipole antenna with a reduced conductive cross-sectional area when viewed from above or below the element.

DESCRIPTION OF THE RELATED ART

In the field of cellular base station antennas, an improvement in dipole antenna performance was illustrated in the U.S. Pat. No. 10,892,559 issued to Farzaneh et. al., (the '559 patent), whereby the dipole elements typically have a central capacitive coupling element, referred to as a parasitic element, soldered or held mechanically in place on top of the two main arms, oriented perpendicular to the vertical axis of the antenna (i.e. parallel to the reflector). The purpose of this additional parasitic element is to increase the frequency bandwidth of the dipole antenna. By optimizing the dimensions of the parasitic element and its location, the bandwidth of the dipole antenna can be modified and/or increased, by creating multiple resonant frequencies, wherein the dipole arms may radiate within a lower part of a band while the parasitic element may radiate within a higher part of the band. The parasitic element is capacitively coupled to the dipole arms.

FIG. 1 is an exemplary prior art image of a dipole antenna 740, which refers to FIG. 7 of the '559 patent incorporated herein by reference, and FIG. 2, refers to FIG. 8 of the '559 patent, showing a dipole 760, having the arms with the parasitic element disposed in the center of the two arms in a cross-shaped dual polarized dipole arrangement.

As explained in more detail in the '559 patent, the antenna in FIG. 2 is similar to the antenna illustrated in FIG. 1, but further includes a parasitic element 810. A substrate 820, such as the dielectric portion of a PCB, includes vertically extending tabs 830. The vertically extending tabs pass through corresponding slits 840 in parasitic element 810 and align the parasitic element 810 with the dipole arms 850 of the antenna. While substrate 820 in FIG. 2 includes four vertically extending tabs 830, substrate 820 may have one, two, three or four tabs. Parasitic element 810 is oriented orthogonally to the dual polarity dipole arm and balun feed planes, resulting in increased conductive cross-sectional area.

SUMMARY OF THE INVENTION

It turns out that the dipole elements incorporating the parasitic elements discussed above have a less than desired return loss characteristics when placed in an array antenna that transmits signals in multiple bands. Cellular base station antennas typically have multiple arrays of elements on a single reflector. As an example, some antennas have a first series of high or mid band elements in a range of 3.2 to 4.2 GHz (referred to herein as the 'H' band) frequencies and mid band elements in the range of 1.695 to 2.690 GHz (referred to herein as the 'E' band) frequencies.

These elements in the form of patch elements or dipoles tend to be the smaller elements on the antenna. On the same antenna, there can also be a low band array of elements in the range of 698 to 960 MHz (referred to herein as the 'K' band frequencies) which typically are larger in size than the mid and high band elements. As a result, the two arms and the parasitic capacitive elements of the low band elements described above, are often positioned above the mid and high band elements.

Consequently, although the parasitic element improves the transmission characteristics of the dipole—for applications where there is a need to place multi-band antenna elements—it can cause interference to the radiated signal patterns and return loss of the mid or high band signals.

To demonstrate this issue, FIG. 3 shows an exemplary prior art array of mid band dipole elements located on a reflector and FIG. 4 shows the plots of return losses of an exemplary mid band frequency range of 1.6 GHz to 2.8 GHz. The plots in FIG. 4 show the return loss at six ports (i.e., for six of the mid band dipole elements), demonstrating an exemplary ideal return loss scenario for such mid band elements. The term 'ideal' is used in the sense that the antenna element return loss has no perturbation from nearby adjacent out-of-band antenna elements, because there are no such antenna elements present: only the mid-band elements are included in this 'ideal' return loss case.

The odd ports (p1/p3/p5) feed the −45° linear polarized part of each of the 2 dipole element columns, while the even ports (p2/p4/p6) feed the +45° linear polarized part. FIG. 4 shows the return loss plot versus frequency and showing that the +45° port return loss responses are quite similar to each other, and the −45° port return loss responses are also quite similar to each other. While the return loss of below −10 dB is generally considered a good return loss, it is the similarity of all −45° linear polarized ports return loss, and that of the +45° ports that indicates that these responses are very repeatable across the 3 columns of element pairs. This observed repeatability of return loss is actually an indication of the repeatability of the radiated patterns across the 3 vertical columns of dipole pairs.

However, FIG. 5 shows a prior art arrangement where low band dipoles 760 with the parasitic elements 810 such as that from FIG. 2, are arranged over the top of the mid band elements 860. FIG. 6 shows the plots of the return loss of the mid band elements being distorted by the larger low band dipoles positioned over them.

As shown in FIG. 6, the return loss plots of mid band elements measured at ports #1-#6 demonstrate a degradation in the plots relative to the ideal plots shown in FIG. 4. To this end, the plots of p1, p3, p5 as well as the plots of p2, p4, p6 diverge from one another each being affected differently because of there physical position/relationship to the larger element above. Furthermore, the antennas demonstrate return loss values that are not acceptable for some applications. With the addition of the low band elements, as shown in FIG. 5, there is no longer symmetry around the central axis of each of the mid band 2-element vertical columns: the low band elements are offset differently for each of the vertical columns of mid band elements. This offset is due to the larger horizontal and vertical low band element spacing, required because of the lower frequency of operation.

As a result of the unique physical configuration of elements, relative to the mid band central axes, each individual column of mid band elements is subject to unique parasitic effects due to the larger low band elements. As discussed above, these parasitic effects perturb the port input return losses, which are shown in FIG. 6, illustrating that the return loss plots of the odd ports (p1/p3/p5) show more divergence relative to one another, as do the even ports (p2/p4/p6), compared to the plots of FIG. 4 (with no low band elements present).

This divergence in return loss frequency response is also an indication of divergence of radiation patterns of the 3 vertical 2-element mid band columns.

Among the issues that are introduced with these divergent performance characteristics are: degraded overall array patterns, which rely on super-position of repeatable individual column patterns, and more complicated and different PCB tuning among the 3 mid band 2-element vertical columns.

FIG. 7 shows another prior art arrangement where prior low band dipoles are arranged over the top of the mid band elements, here with the large circular capacitive coupling element.

FIG. 8 illustrates the return loss of the mid band elements being distorted by the larger low band dipoles positioned over them, again because of the large round capacitive coupling element on top of the arms.

As shown in FIG. 8, the return loss plots of mid band elements measured at ports #1-#6 demonstrates an even greater perturbation of port frequency response relative to the already perturbed response in FIG. 6, and thus a set of plots even further from the ideal return loss frequency response shown in FIG. 4.

To illustrate that this return loss interference is from the arms and the parasitic capacitive coupling element of the larger low band dipoles that are parallel to the reflector, and not from the vertical balun feeds that are perpendicular to the reflector, FIG. 9 shows a first simulation test with mid band elements positioned next to larger low band elements, however, only with the balun feeds being present, and the arms removed.

A simulation of the arrangement illustrated in FIG. 9 resulted in a return loss plot illustrated in FIG. 11. As shown in FIG. 11 the return loss at the tested ports #1-#6 is very good and similar to that shown in FIG. 4 with the ideal return loss for the mid band elements on their own, without any low band element and low band element parasitic effect and considered as the ideal case from that perspective.

This is contrasted with the simulated test arrangement in FIG. 11 with mid band elements positioned next to larger low band elements, however, with the vertical balun feeds not being present, only the arms and the parasitic capacitive coupling element included. As shown in FIG. 12 the return loss at the tested ports #1-#6 is heavily degraded, similar to that shown in FIGS. 7 and 9 unlike the ideal return loss for the mid band elements shown in FIG. 4.

The present arrangement overcomes the drawbacks with the prior art by providing a novel construction for a capacitive coupling element on a dipole that has a low cross-sectional area with a reduced parasitic effect on the return loss experienced at ports for higher band smaller elements positioned thereunder.

This capacitive coupling element is in the form of a conductive strip formed on a PCB (printed circuit board) construction that is placed in parallel with the dipole conductive strip of the dipole arm. To that end, the conductive strip of the capacitive element is formed on a first copper layer of the PCB in parallel to an extended conductive strip of a dipole arm, that is also disposed on the first copper layer of the PCB. The conductive strip of the capacitive element extends horizontally from the center of the dipole arm in an equal distant on each side. A capacitive plate is placed on the second copper layer of the PCB on the opposite side of the first copper layer and is coupled to the conductive strip of the capacitive element via a plated through hole. The capacitive plate placed on the second copper layer extends downwardly so that a portion of it overlaps with the dipole conductive strip located on the first copper layer forming the capacitance of the capacitive coupling element.

This results in a dipole arrangement that still benefits from the capacitive coupling element, for example achieving broad bandwidth return loss in the low frequency range, while simultaneously having little impact on the return loss of the smaller mid or high band elements located on the same reflector, since the cross section of the capacitor is substantially limited to the thickness of the dipole PCB board.

In accordance with still another embodiment, the capacitance of the capacitive coupling element is defined as a function of the area of the conductive plate overlapping the dipole conductive strip located on the first copper layer of each dipole arm.

In accordance with yet another embodiment, the length of the capacitive coupling element beyond the via hole can be adjusted to optimize the return loss of the dipole antenna.

BRIEF DESCRIPTION OF THE DRAWINGS

The present invention can be best understood through the following description and accompanying drawing, wherein.

DETAILED DESCRIPTION

In one embodiment shown in FIGS. 13-17 elements of a low band dipole 10 (698 MHz to 960 MHz) are explained in more detail. Dipole 10 as indicated above is a cross-shaped dual polarized antenna formed by two dipoles 10*a* and 10*b*.

More specifically, FIGS. 13-16 illustrate the arrangement of one of the dipoles such as dipole 10*a*. In accordance with one embodiment the dipoles are formed on a printed circuit board (PCB) having a first copper layer and a second copper layer on each side of the board.

Figure 13:
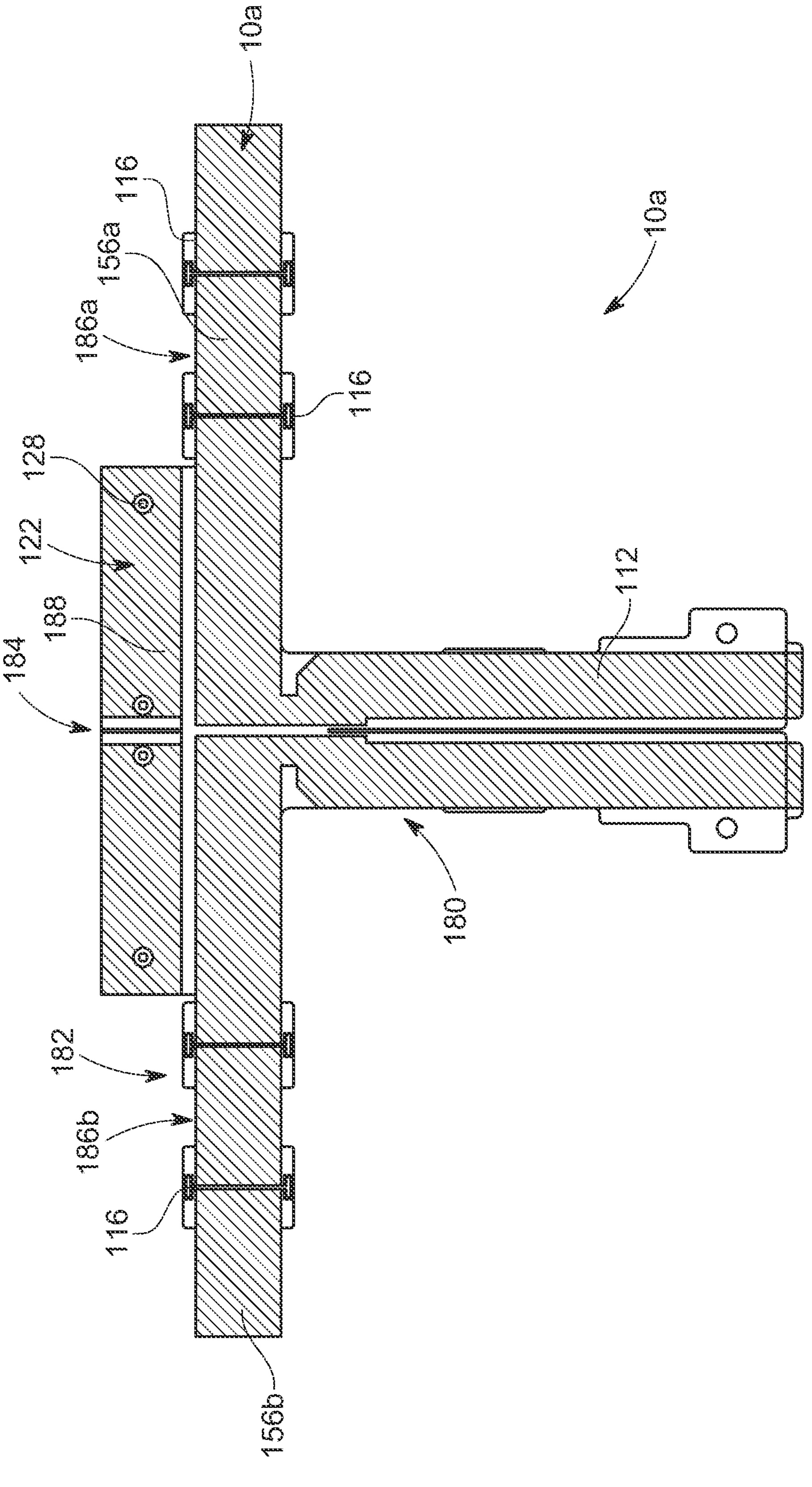
FIG. 13 shows a first copper layer of a PCB dipole with a vertically positioned capacitive coupling element on the arms, in accordance with one embodiment.

FIG. 13 illustrates the first copper layer of the PCB wherein PCB dipole 10*a* is formed. The vertical section 180 includes a balun 112 formed by the first copper layer including two vertical balun copper strips forming two copper strip branches 156*a*, 156*b*, that are extended to and along horizontal section 182 of the dipole each branch extending horizontally outward, a first branch 156*a* in one direction and a second branch 156*b* in the opposite direction. Balun feeds 112 are formed by the conductive strips on each side of the PCB dipole and etched to form a microstrip structure with signal and ground conductors.

The PCB's horizontal section 182 includes a first wider portion that defines central capacitive coupling element 122 extending from the PCB's vertical central axis 184 equally in opposite directions along the horizontal axis. Horizontal section 182 includes a narrower portion 186*a* and 186*b* extending along the dipole arms in both directions. The first copper layer of wider portion 188 includes a conductive strip 188 that is parallel to, and electrically insulated from strips 156*a* and 156*b* at a distance such as distance d shown in FIG. 15.

In accordance with one embodiment, dipole 10 includes resonant structures 116 along the antenna balun and the cross arms, as explained in more detail in the U.S. Pat. No. 11,387,567, issued on Jul. 12, 2022, and incorporated herein by reference, causing a substantially closed circuit at a first lower frequency band ('low band') and a substantially open circuit at a second higher frequency band ('mid band'), effectively reducing the parasitic effects of the low band element on the antenna transmission from adjoining high band frequency antenna elements (not shown).

Figure 14:
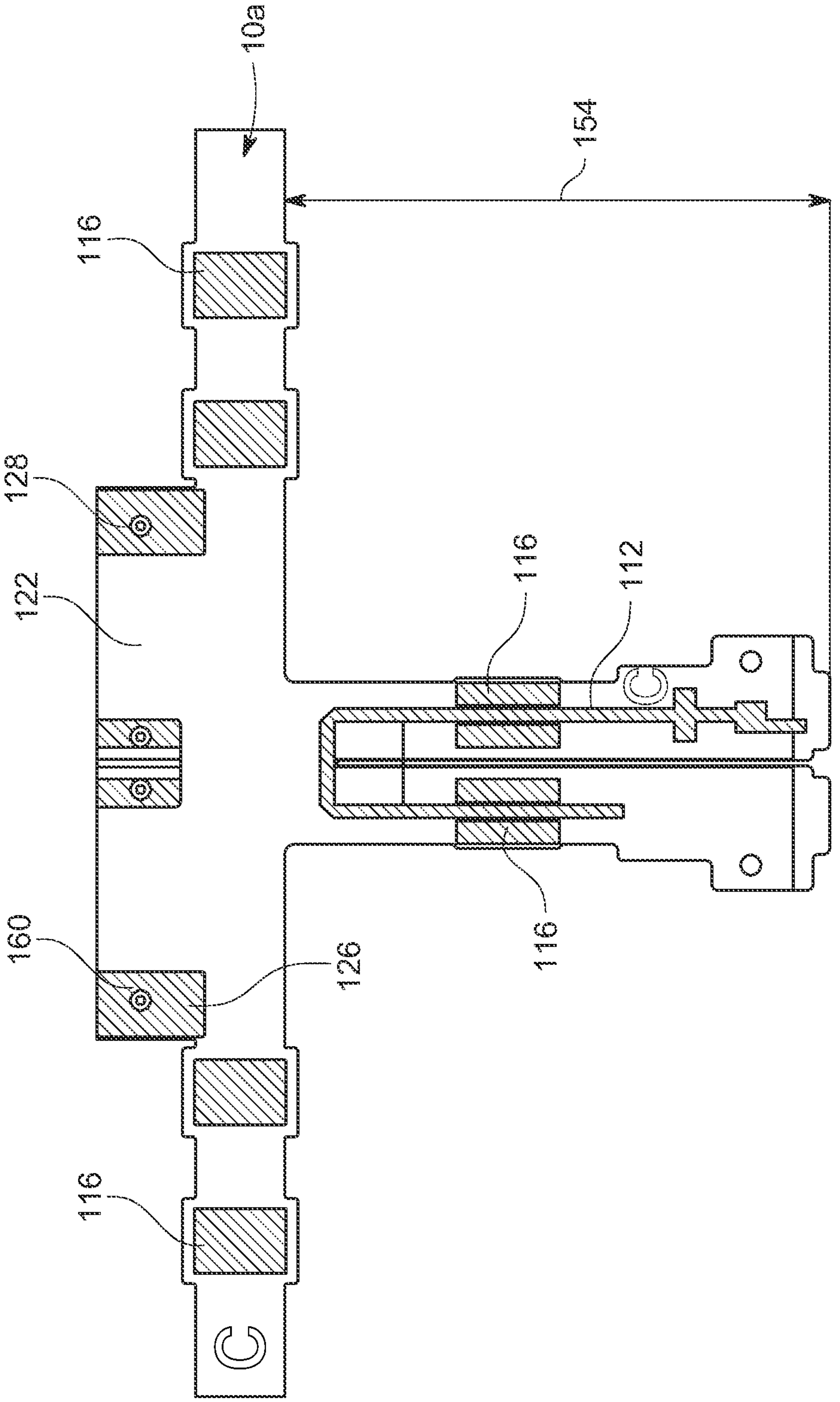
FIG. 14 shows a second copper layer of the PCB dipole illustrated in FIG. 13.

FIG. 14 illustrates the layout of the second copper layer of PCB dipole 10*a*, which is the reverse side of the PCB's first copper layer of dipole 10*a* illustrated in FIG. 13. The dipole's balun 112 on the second copper layer is formed by conductive strips extending vertically along vertical section 180 of the PCB.

As illustrated in FIG. 14 the second copper layer opposite conductive strip 188 on the first copper layer of the PCB, has no conductive strip, but includes a capacitive plate 160 attached to the PCB and electrically coupled to conductive strip 188 by a plated via hole 128, near each end of capacitive element 122. To this end, portion 126 of capacitive plate 160 extends downwardly to overlap with conductive strip 156*a* and 156*b* on the first copper layer of the PCB.

Capacitive plate 160, as well as portion 126 in accordance with one embodiment have rectangular shapes such that the conductive portion 126 on the second copper layer of the PCB and conductive strips 156*a* and 156*b* on the first copper layer of the PCB form a capacitor, with a capacitance C, and referred to as central capacitive element 122.

Capacitance C formed by the conductive strip 156 on the first copper layer and capacitive overlap portion 26 disposed on the second copper layer, is defined as:

$$C=\varepsilon r^*\varepsilon o^*A/d\text{[Farads]}$$

Where

εr=relative permittivity of PCB material

εo=permittivity of a vacuum [F/m]

A=area of conductor overlap d=PCB thickness (separating conductors 160 and 156)

In accordance with one embodiment, the conductive structures described above are implemented on the first and second copper layer of an insulating PCB substrate, such as Rogers RO4534. In accordance with one embodiment of the invention, dipole 10*a* has various dimensions including width 140 of conductive plate 160 being 5 mm, and the height of conductive strip 188 being 4.3 mm, and thickness of PCB insulating material being 0.5 mm, and height 146 of overlap plate 126 being 2.6 mm, and length of dipole arm from its central axis to its end being 95.9 mm and width of narrow portion 186 of dipole arm being 11 mm and length of capacitive element 122 being 54.5 mm and height 154 of the dipole element from the arm to the reflector being 81.6 mm.

Figure 11:
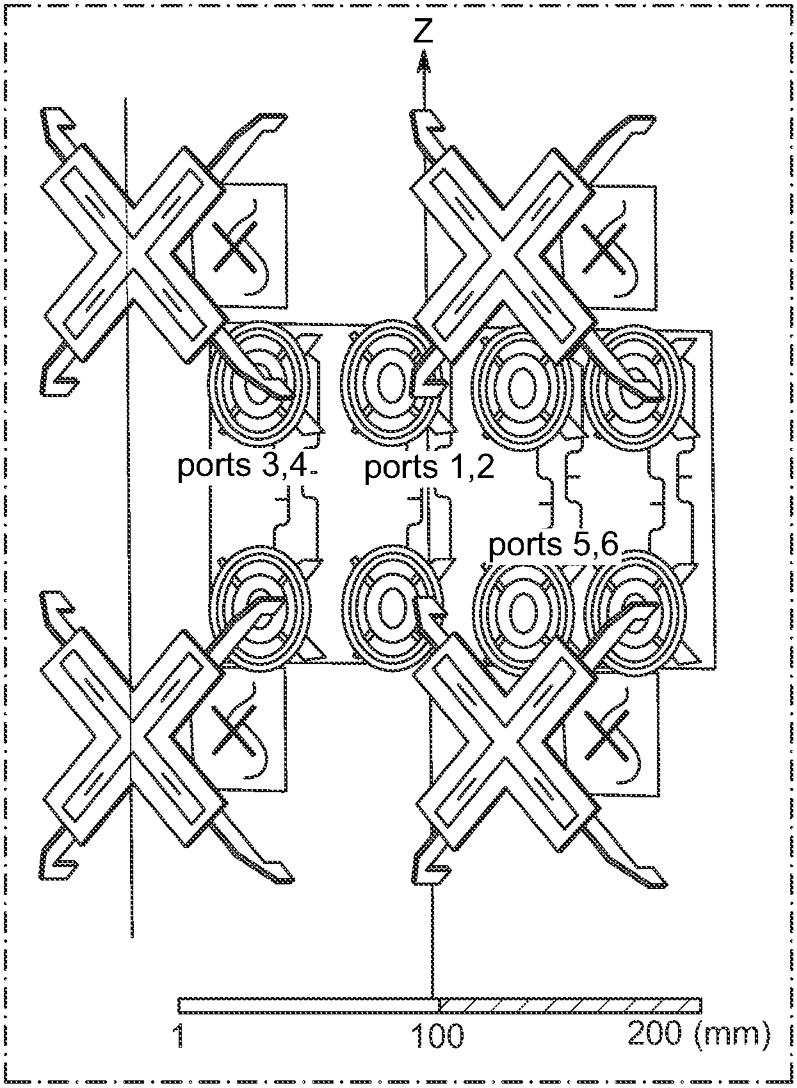
FIG. 11 shows a simulated set of mid band elements fed by six feed ports with dipoles from FIG. 2 (arms and parasitic capacitive coupling elements) thereover.
Figure 12:
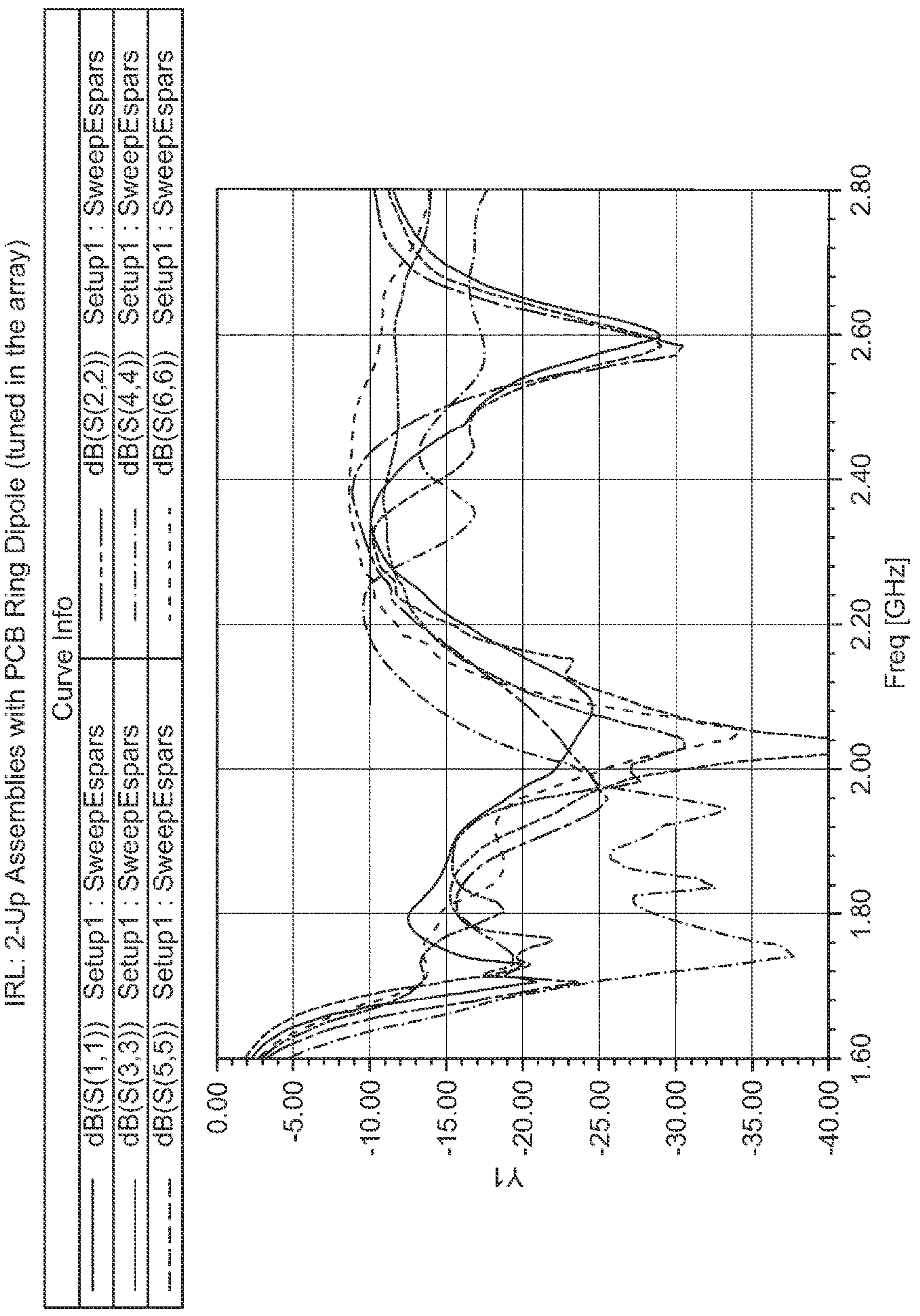
FIG. 12 shows a graph of return loss across the six ports from FIG. 11 in the range 1.6-2.8 GHz.
Figure 15:
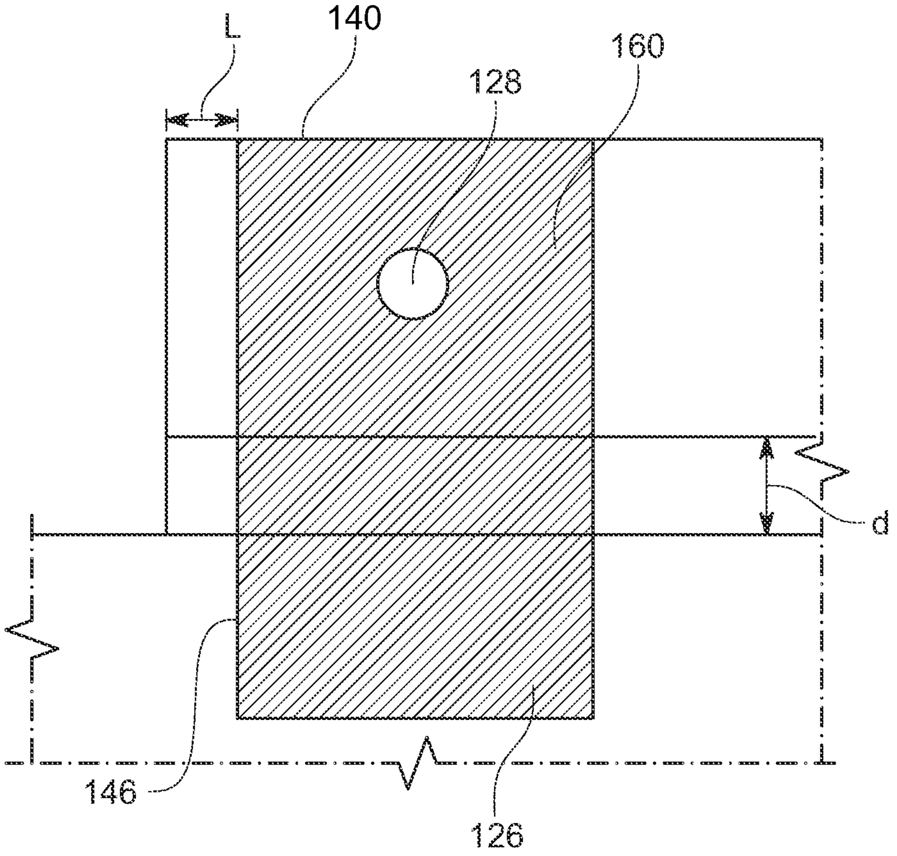
FIG. 15 illustrates the capacitive element of a dipole formed by the first copper layer and the second copper layer of the PCB dipole.
Figure 16:
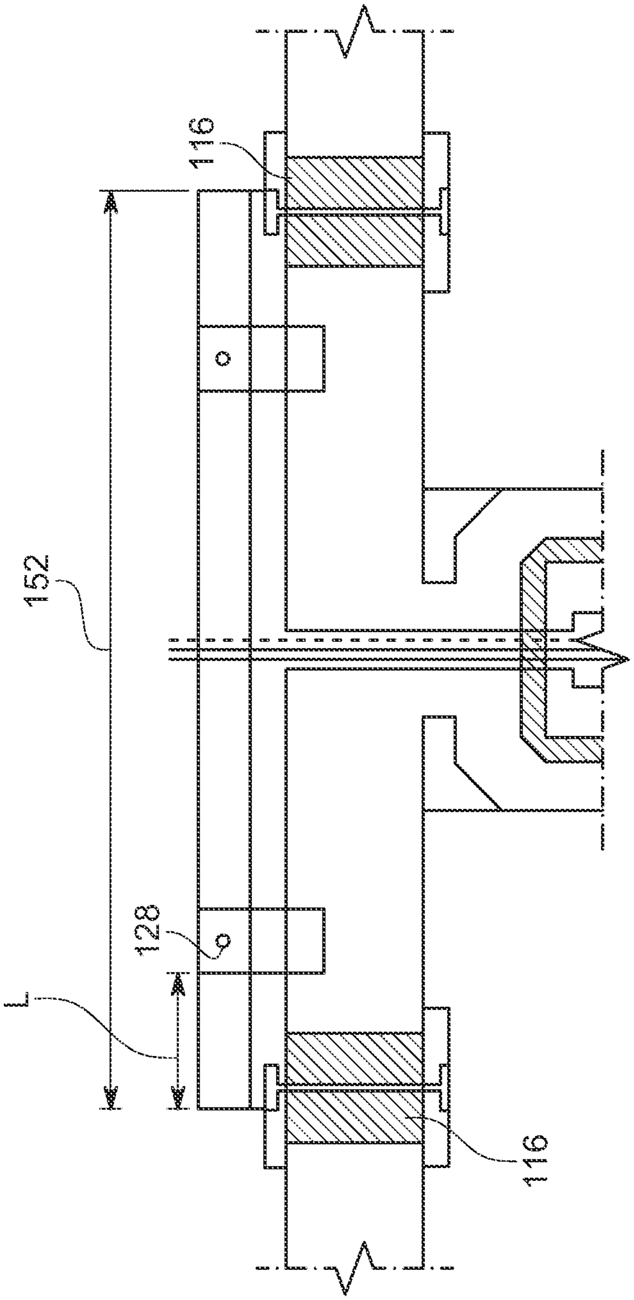
FIG. 16 illustrates another embodiment of the present invention.

Furthermore, FIG. 16 illustrates another embodiment of the invention where the length L of capacitive element 122 extending beyond the overlap area changes for example form 1.3 mm in FIGS. 15 to 11 mm in FIG. 16 depending on determining an optimum return loss characteristic for any given application.

Figure 17A:
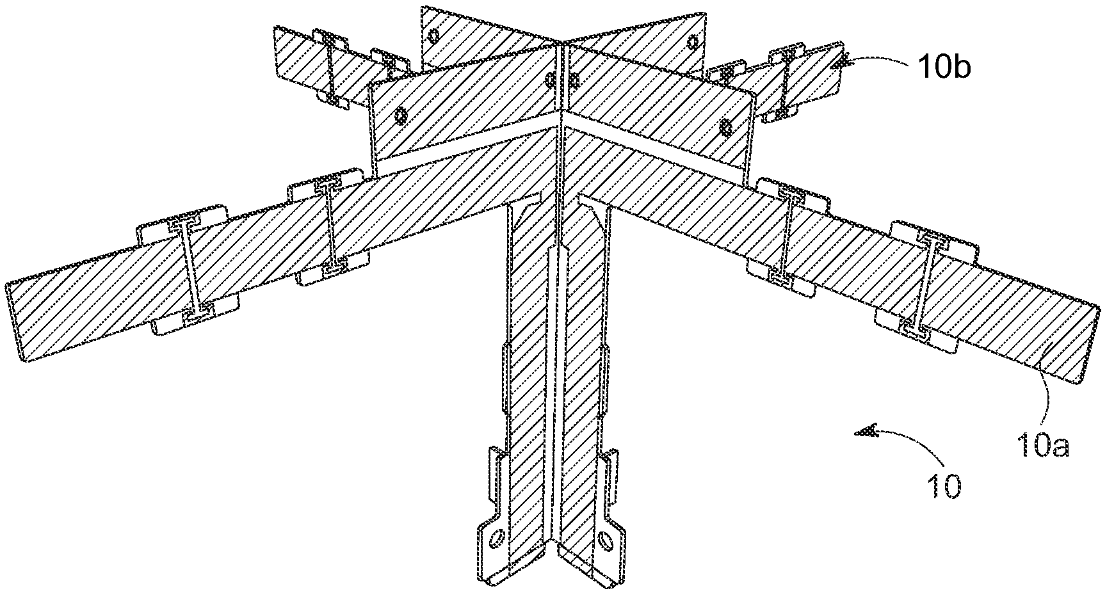
FIG. 17A illustrates a cross shaped dipole PCB formed by two dipoles illustrated in FIGS. 13 and 14.

FIG. 17A illustrates a cross shaped dipole PCB 10 formed by two dipoles 10*a* and 10*b*, wherein the details of each of the dipoles have been explained in more detail in reference with FIGS. 13-16. FIG. 17A represents the view of dipole 10 wherein the first copper layer of each dipole 10*a* and 10*b* is visible.

Figure 17B:
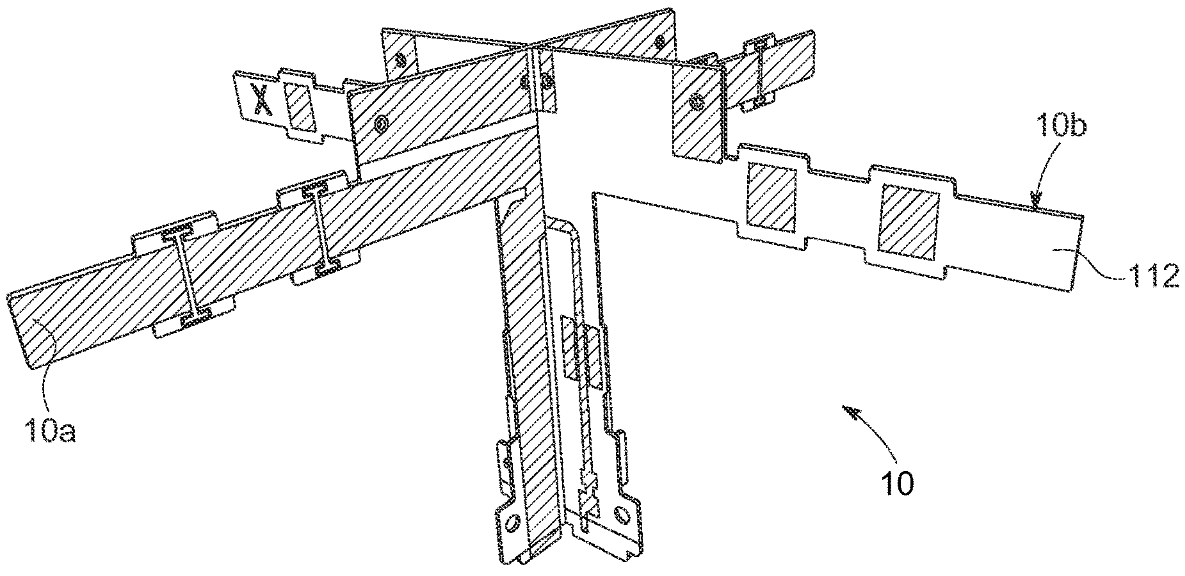
FIG. 17B illustrates the dipole in FIG. 17A, rotated 90 degrees in counter-clockwise direction.

FIG. 17B illustrates the dipole in FIG. 17A, rotated 90 degrees in counter-clockwise direction, representing the view of dipole 10 wherein the first copper layer of dipole 10*a* and second copper layer of dipole 10*b* is visible.

Figure 17C:
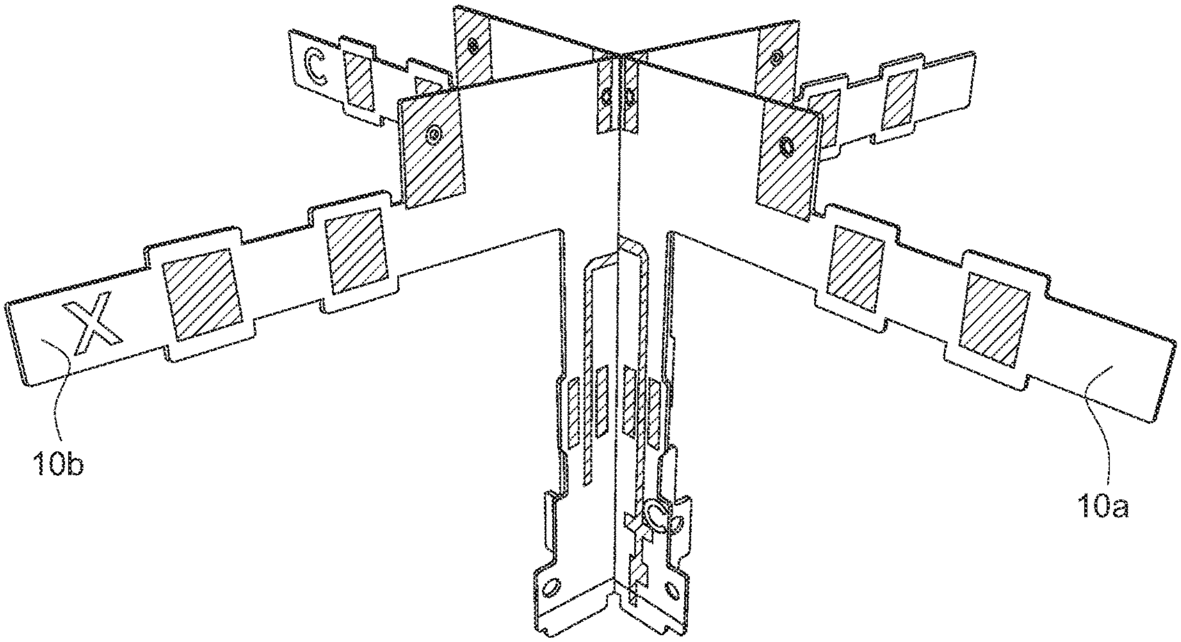
FIG. 17C illustrates the dipole in FIG. 17A, rotated 180 degrees in counter-clockwise direction.

FIG. 17C illustrates dipole 10 in FIG. 17A rotated 180 degrees in counter-clockwise direction, representing the view of dipole 10 wherein the second copper layer of dipole 10*a* and the second copper layer of dipole 10*b* is visible.

Figure 17D:
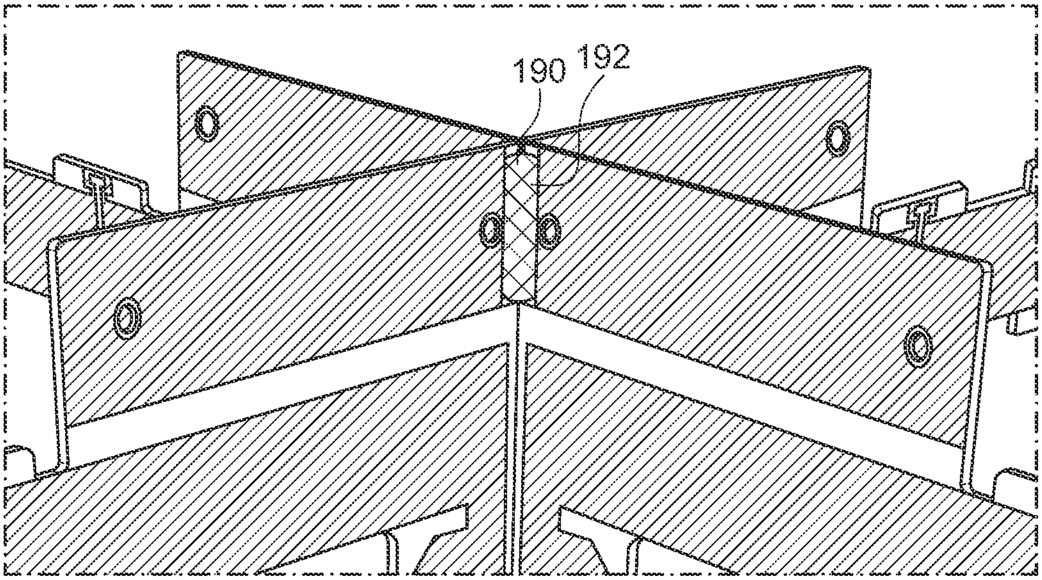
FIG. 17D illustrates the cross connection of the two cross shaped dipoles in more detail.

FIG. 17D illustrates the cross connection of the two cross shaped dipoles, where each of the four corners 190 of central capacitive elements 122 formed by the intersection of dipoles 10*a* and 10*b* is soldered along angle 192. To this end there are 4 solder applications at the 4 central corners of the assembled dipole.

Figure 18A:
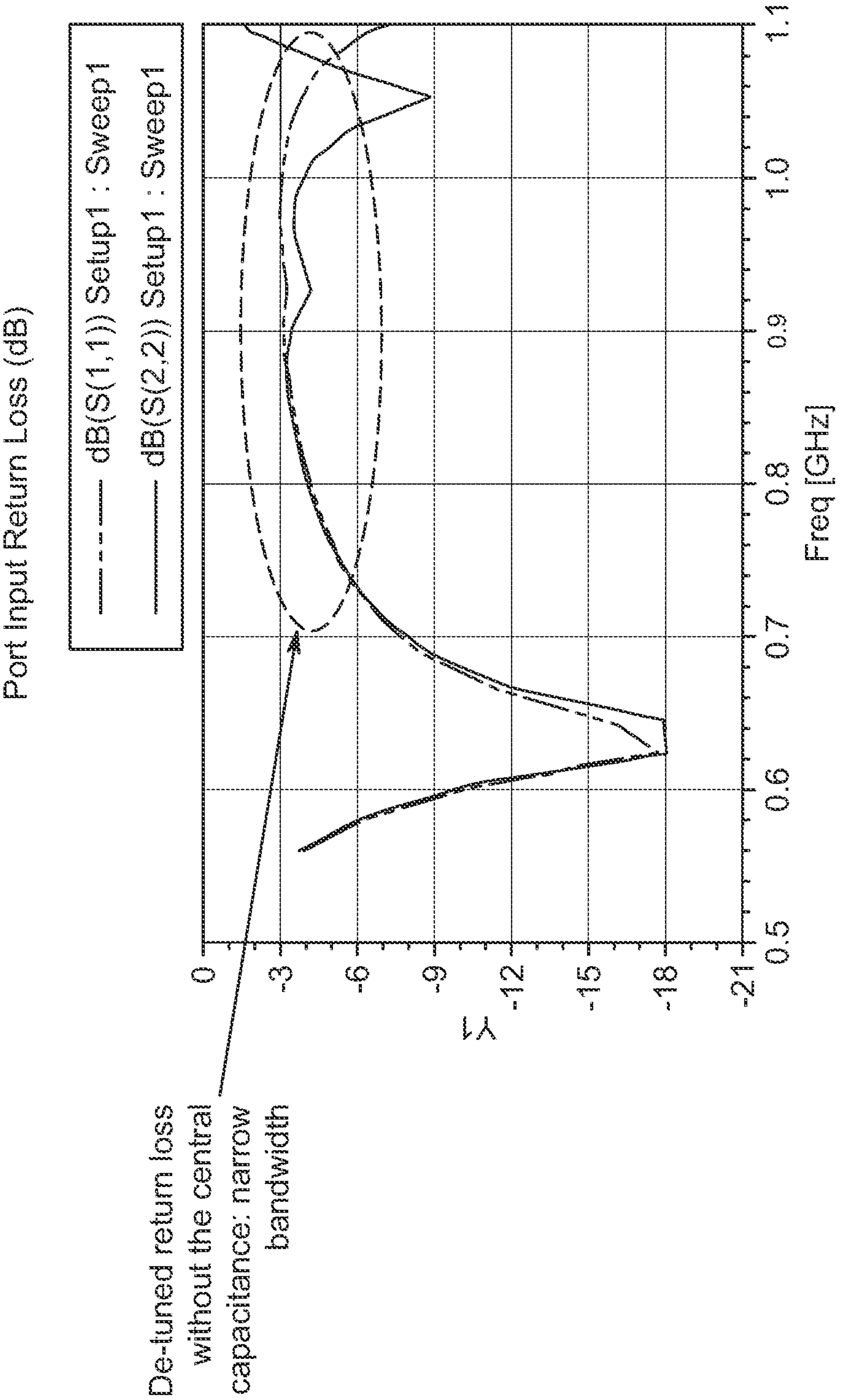
FIG. 18A shows a graph of return loss over 0.5-1.1 GHz for a dipole element with no capacitive coupling element.
Figure 18B:
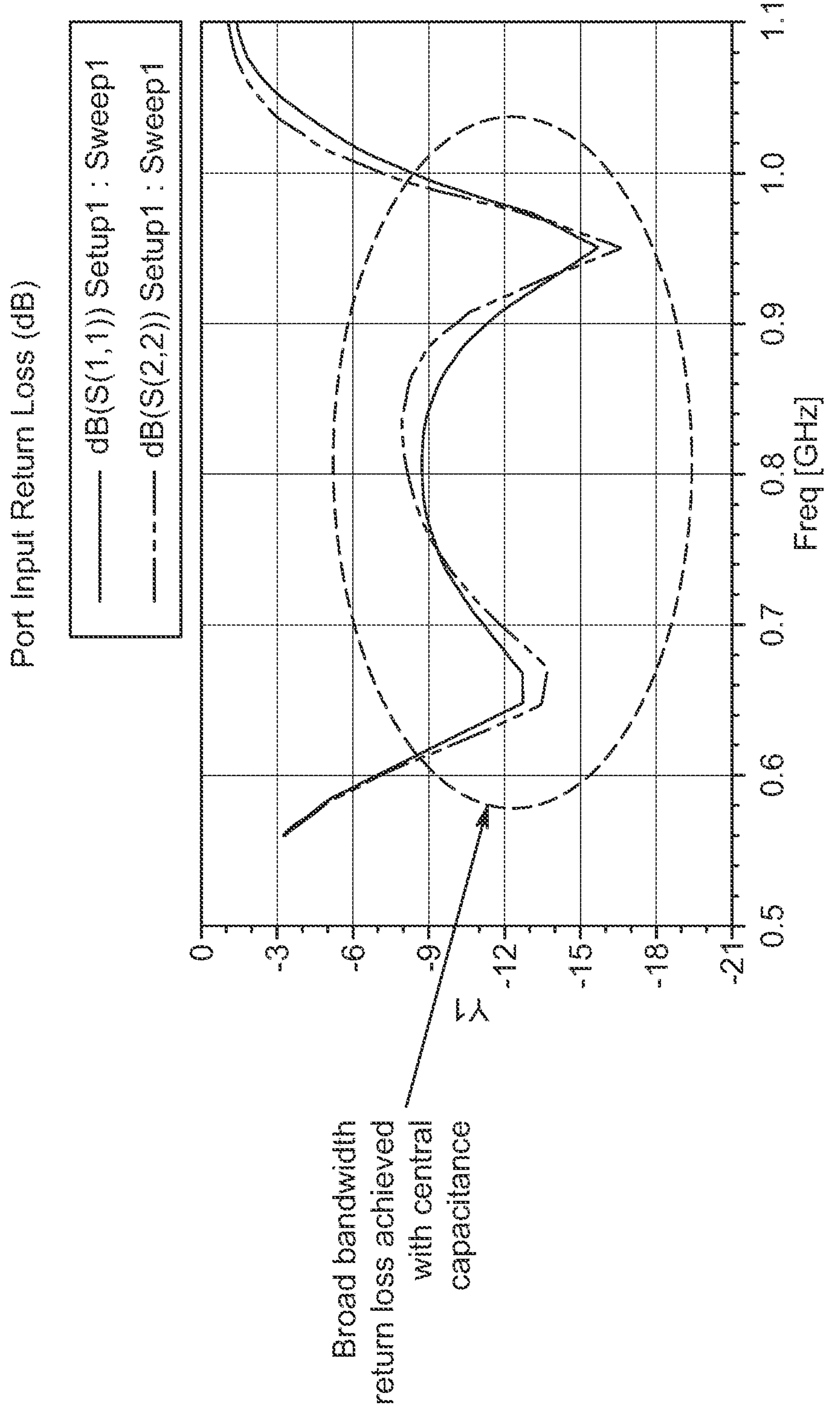
FIG. 18B shows a graph of return loss over 0.5-1.1 GHz for a dipole element with a capacitive coupling element in accordance with one embodiment.

The performance of the dipole arm in accordance with the present invention including the effect of the capacitive coupling as described in the example above, can be appreciated by illustrating the change in the Dipole's return loss before and after the application of the capacitive coupling. As can be seen in FIG. 18A, a return loss plot which is defined as:

$$\text{Return Loss}=v(\text{refl})/v(\text{inc})$$

v(refl)=reflected voltage wave v(inc)=incident voltage wave $$\text{Return Loss (dB)}=20^*\log 10(v(\text{refl})/v(\text{inc}))$$

is provided over 0.5-1.1 GHz (low band) showing that without the central capacitive element 122, there is a narrow bandwidth of frequency range with an acceptable return loss characteristics, whereas FIG. 18B shows a broader bandwidth of frequency range with an acceptable return loss characteristics, as achieved when the central capacitance 122 is provided.

Figure 1:
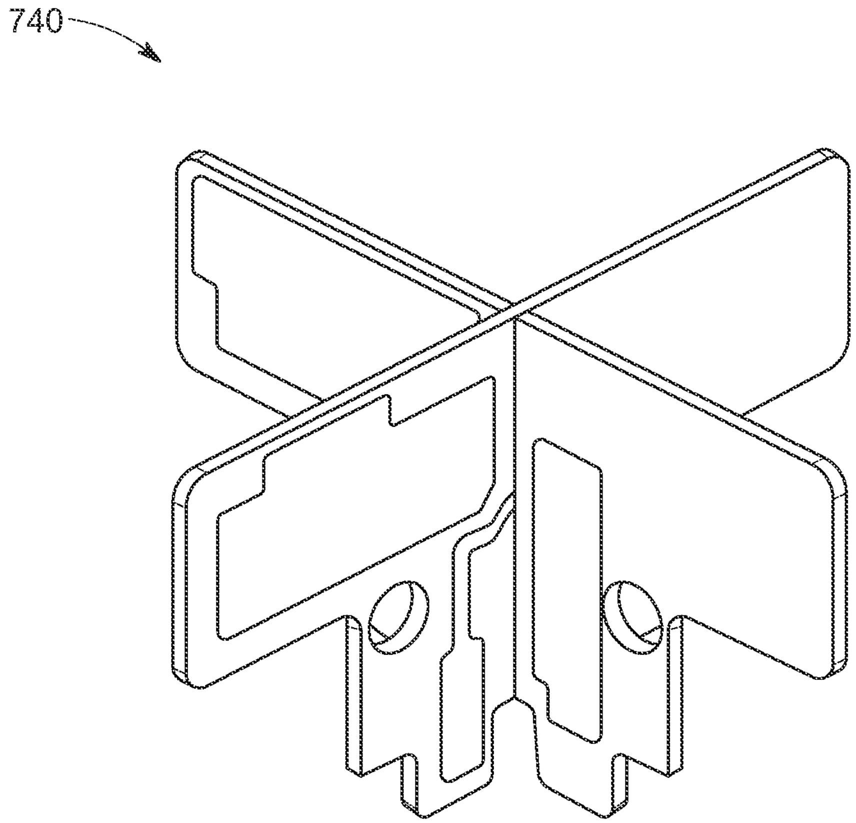
FIG. 1 (PRIOR ART)
FIG. 1 shows a prior art dipole antenna.
Figure 2:
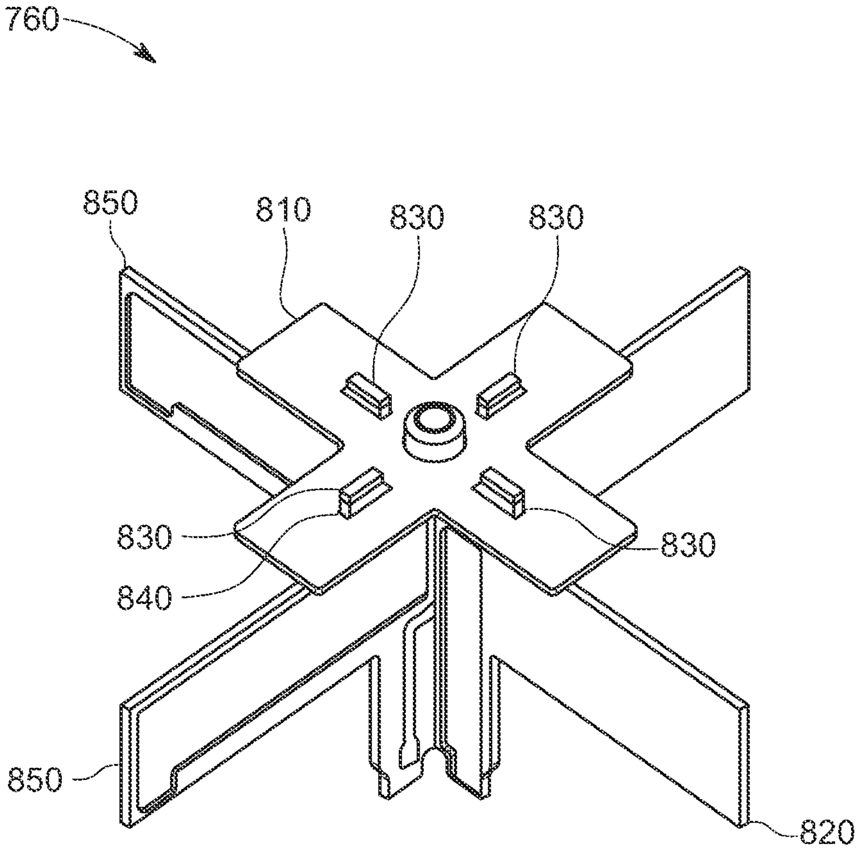
FIG. 2 (PRIOR ART)
FIG. 2 shows a prior art dipole antenna with a cross shaped parasitic capacitive coupling element.
Figure 3:
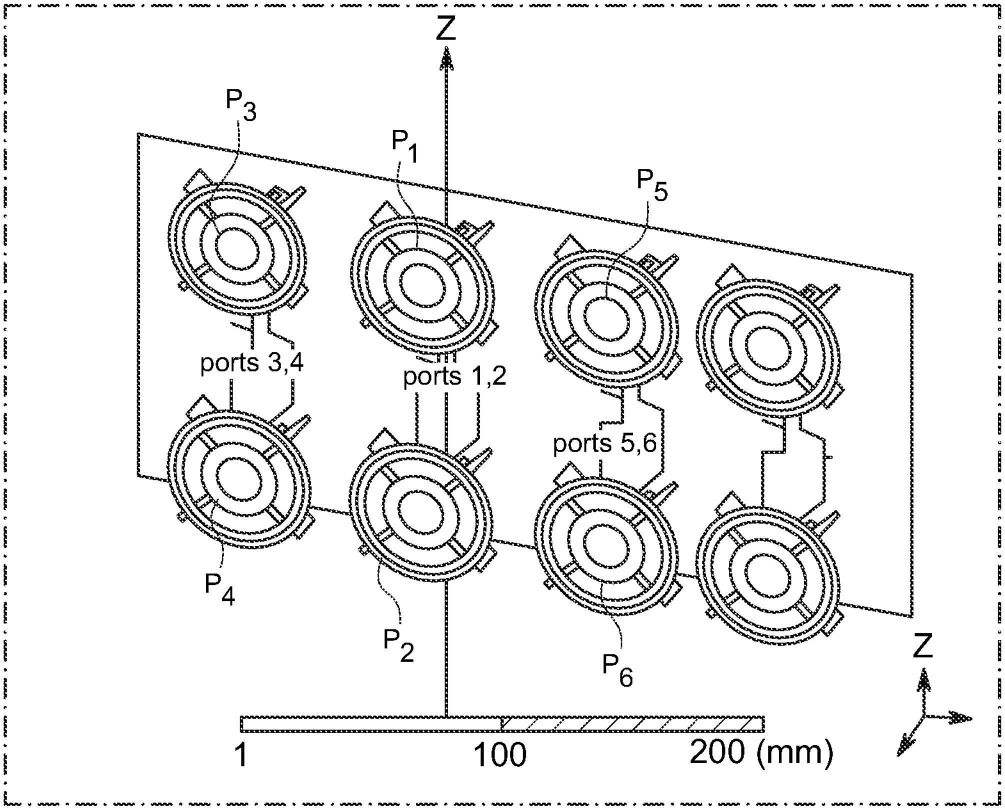
FIG. 3 (PRIOR ART)
FIG. 3 shows a prior art set of mid band elements fed by six feed ports.
Figure 4:
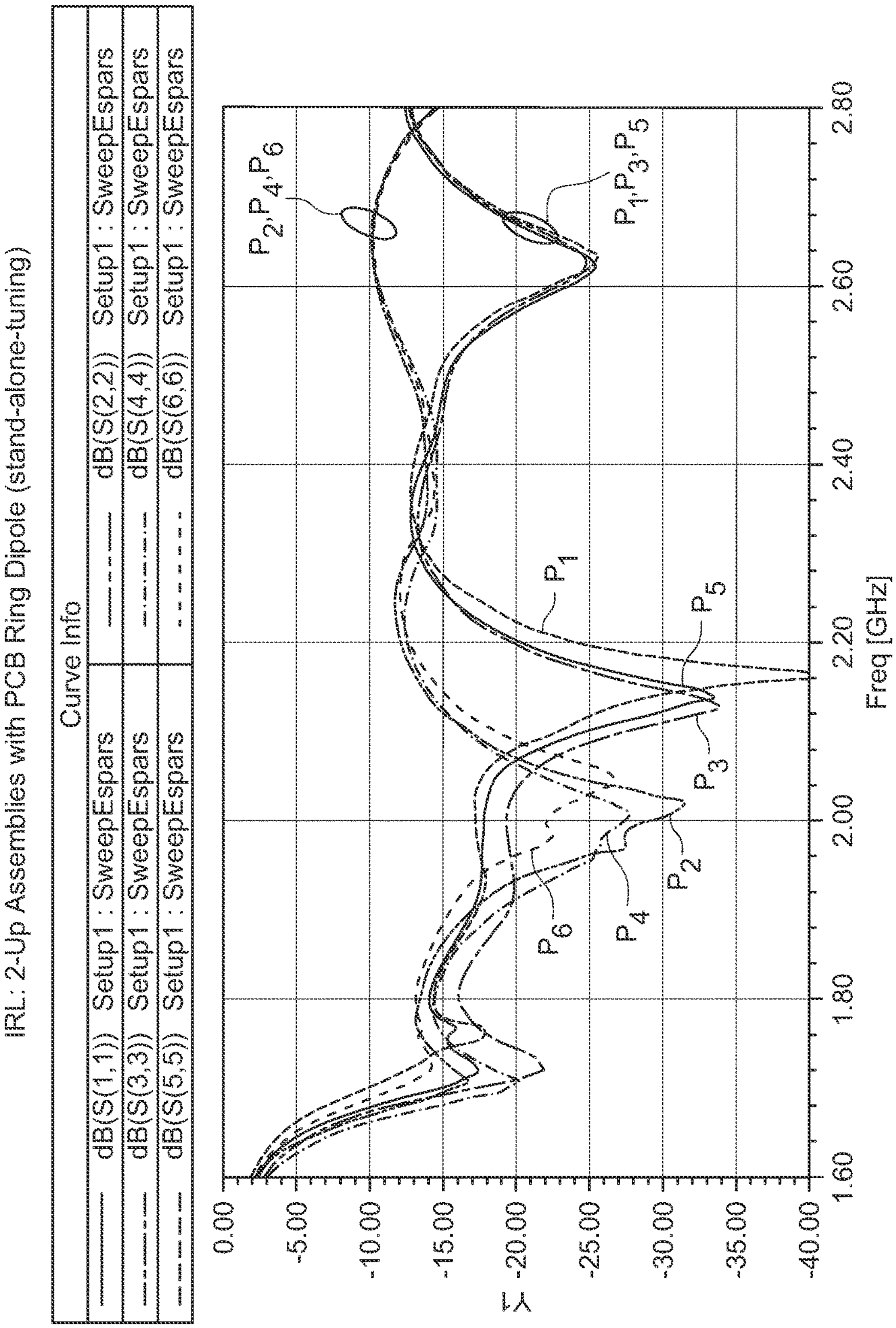
FIG. 4 (PRIOR ART)
FIG. 4 show a graph of return loss across the six ports from FIG. 3 in the range 1.6-2.8 GHz.
Figure 19:
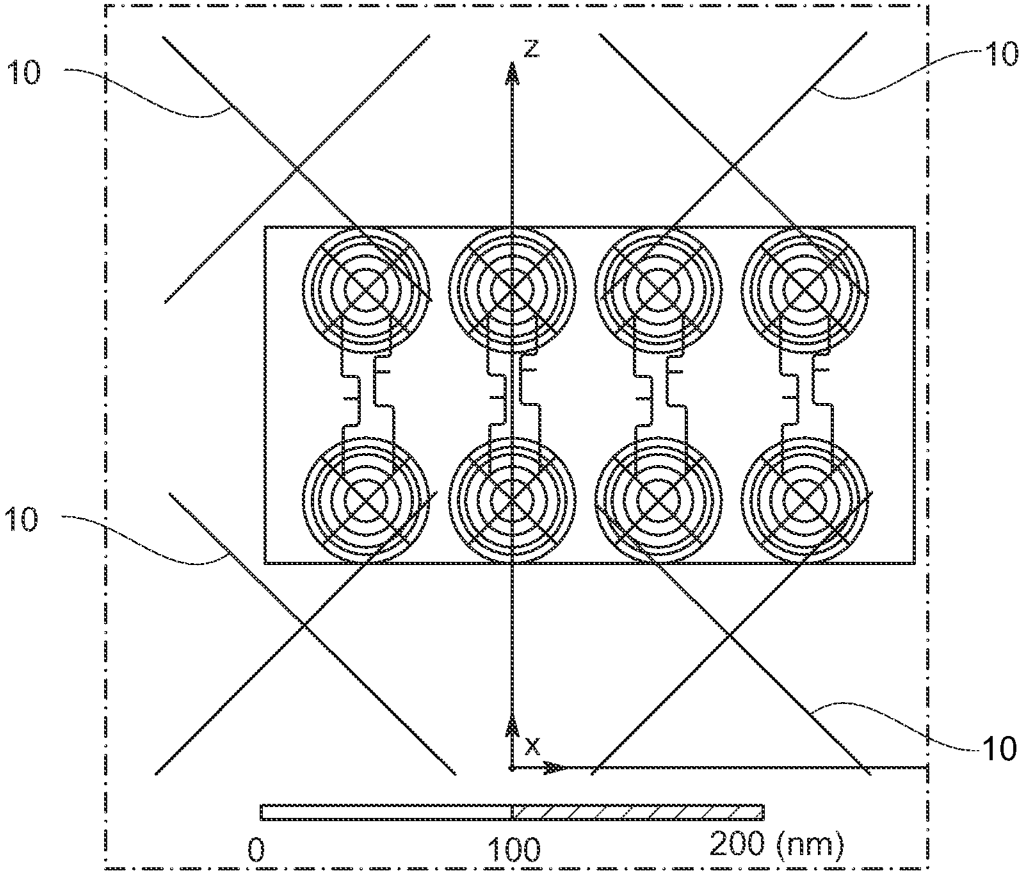
FIGS. 19 and 20 show the present dipole with vertically positioned capacitive coupling element positioned over the smaller mid band dipole elements from FIG. 4.
Figure 20:
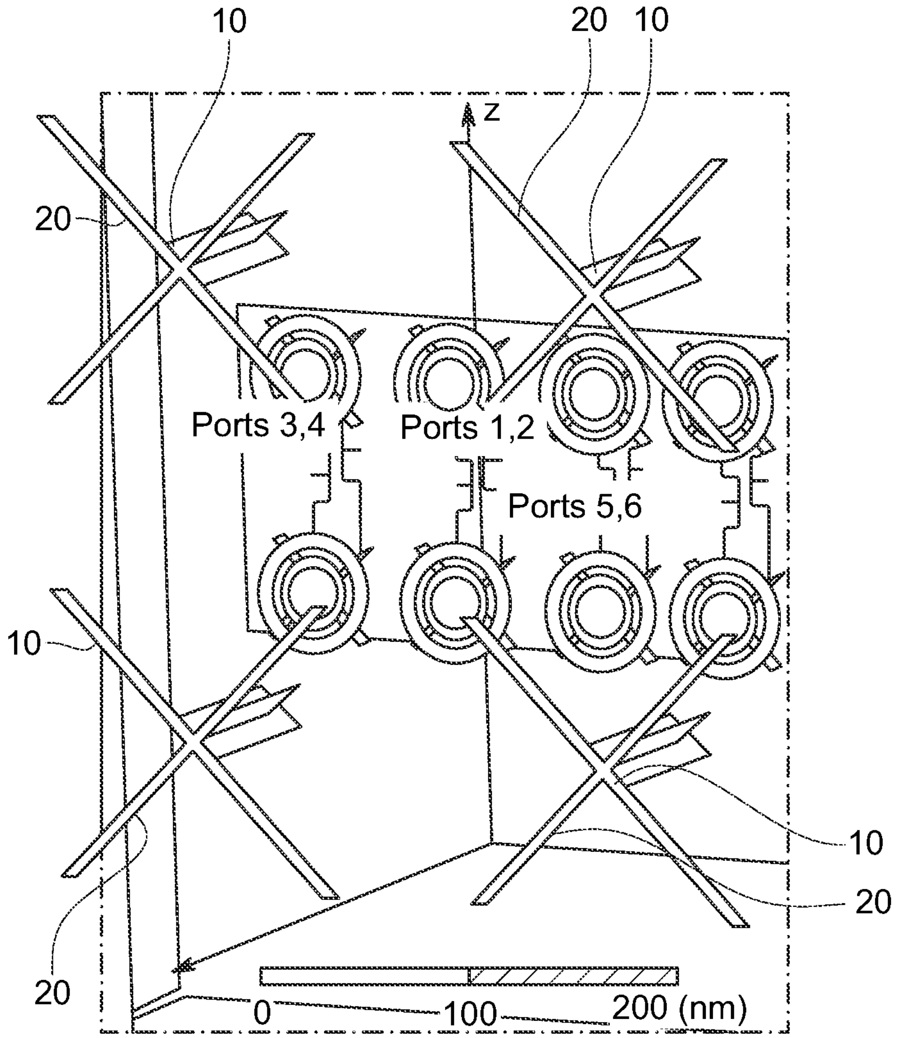

FIGS. 19 and 20 show a multiband antenna array wherein FIG. 19 is a normal view from above, emphasizing the low cross-sectional area of the low band elements, and FIG. 20 is an isometric view, showing a dipole with vertically positioned central capacitive coupling element 122 positioned over the smaller mid band dipole elements from FIG. 4.

To demonstrate the effectiveness of dipole 10 in accordance with the present invention, and its central capacitive coupling elements 122, as shown in FIG. 13 a test was run with dipoles 10 positioned over the same array of mid band dipole elements (see e.g., FIG. 4) located below dipole 10 and above the reflector.

Figure 5:
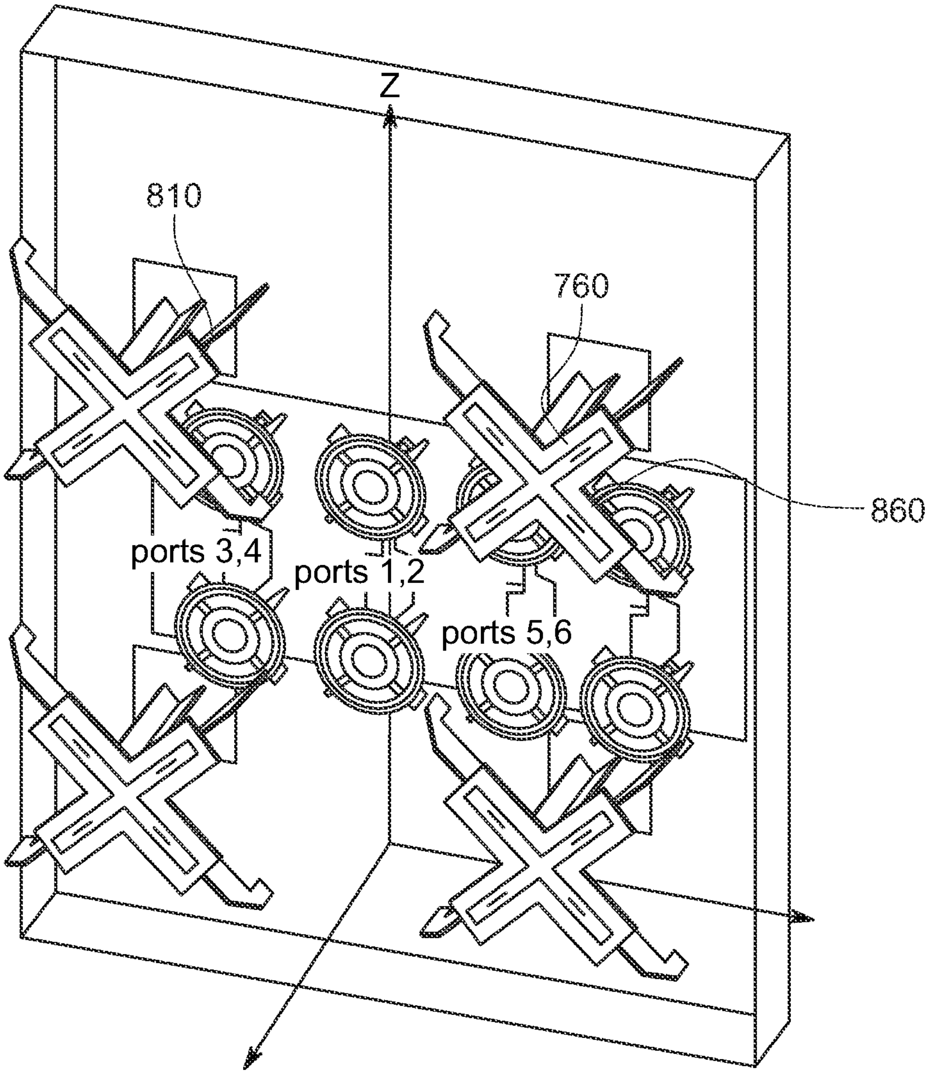
FIG. 5 (PRIOR ART)
FIG. 5 shows a prior art set of mid band elements fed by six feed ports with dipoles from FIG. 2 thereover.
Figure 6:
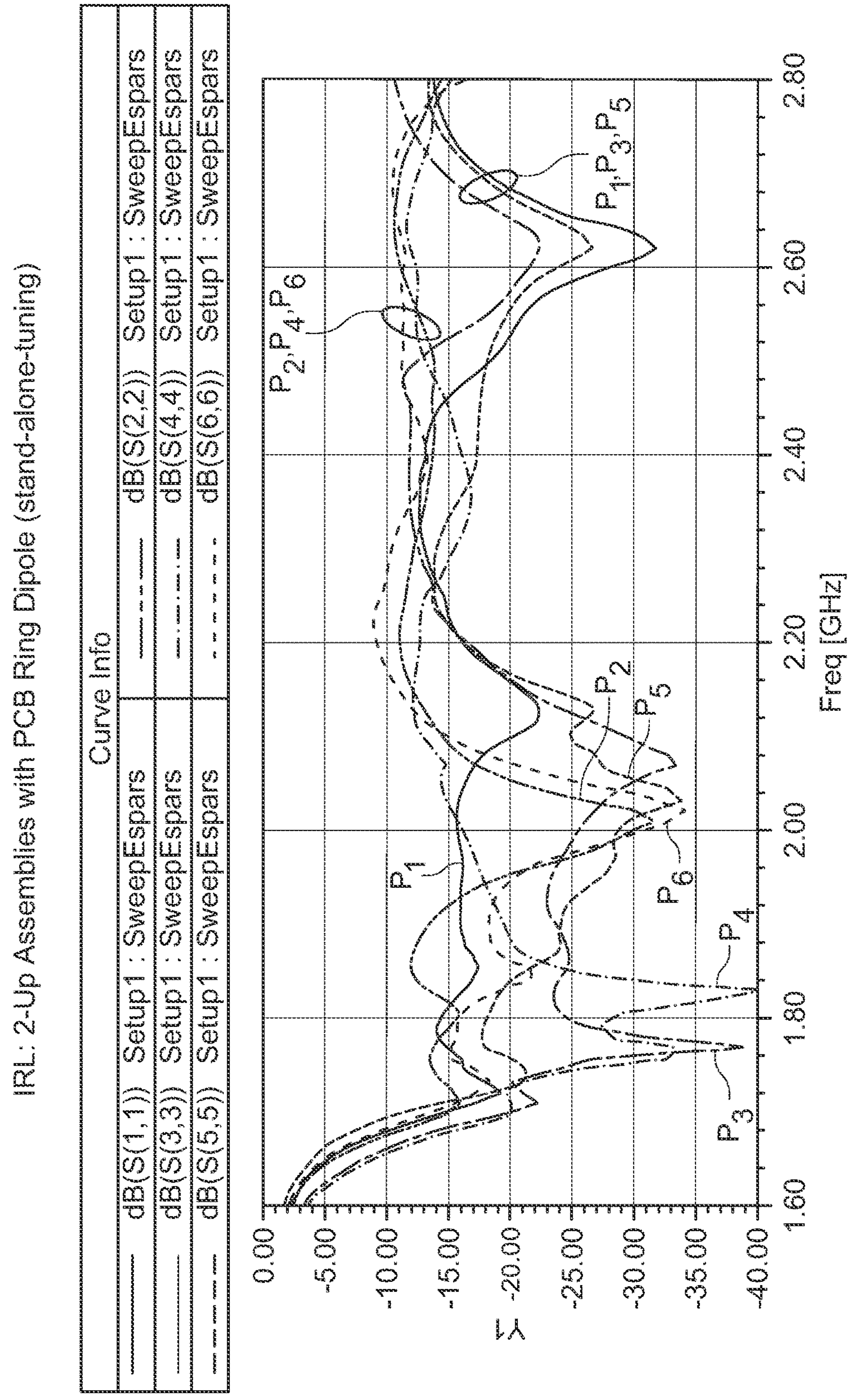
FIG. 6 (PRIOR ART)
FIG. 6 shows a graph of return loss across the six ports from FIG. 5 in the range 1.6-2.8 GHz.
Figure 7:
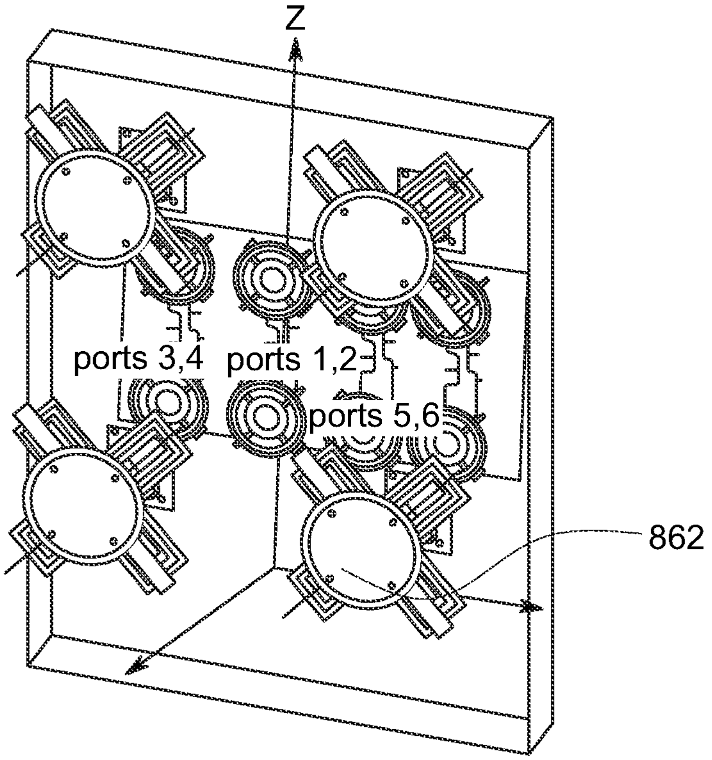
FIG. 7 (PRIOR ART)
FIG. 7 shows a prior art set of mid band elements fed by six feed ports with dipoles having circular shaped parasitic capacitive element.
Figure 8:
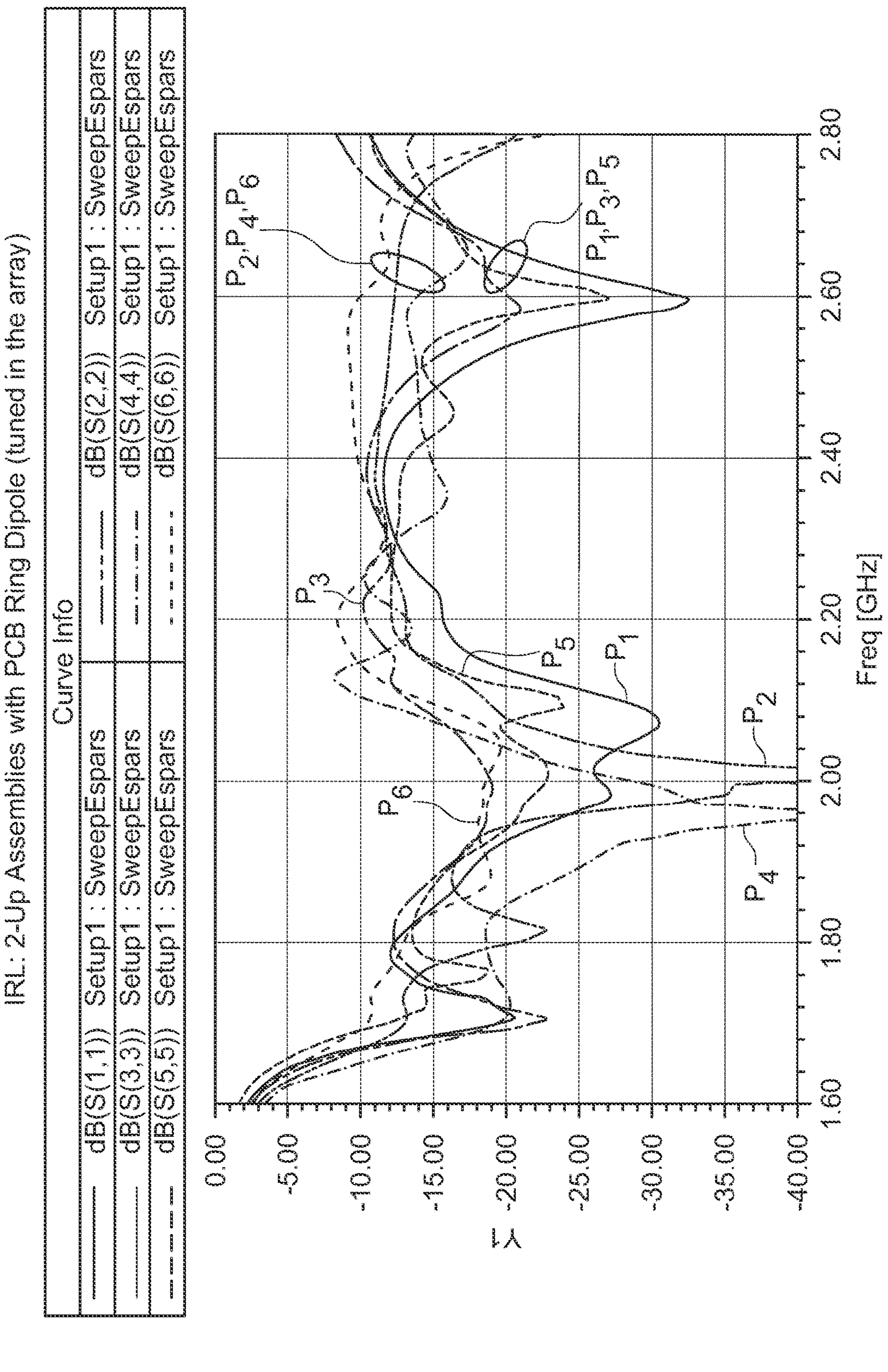
FIG. 8 (PRIOR ART)
FIG. 8 shows a graph of return loss across the six ports from FIG. 6 in the range 1.6-2.8 GHz.
Figure 9:
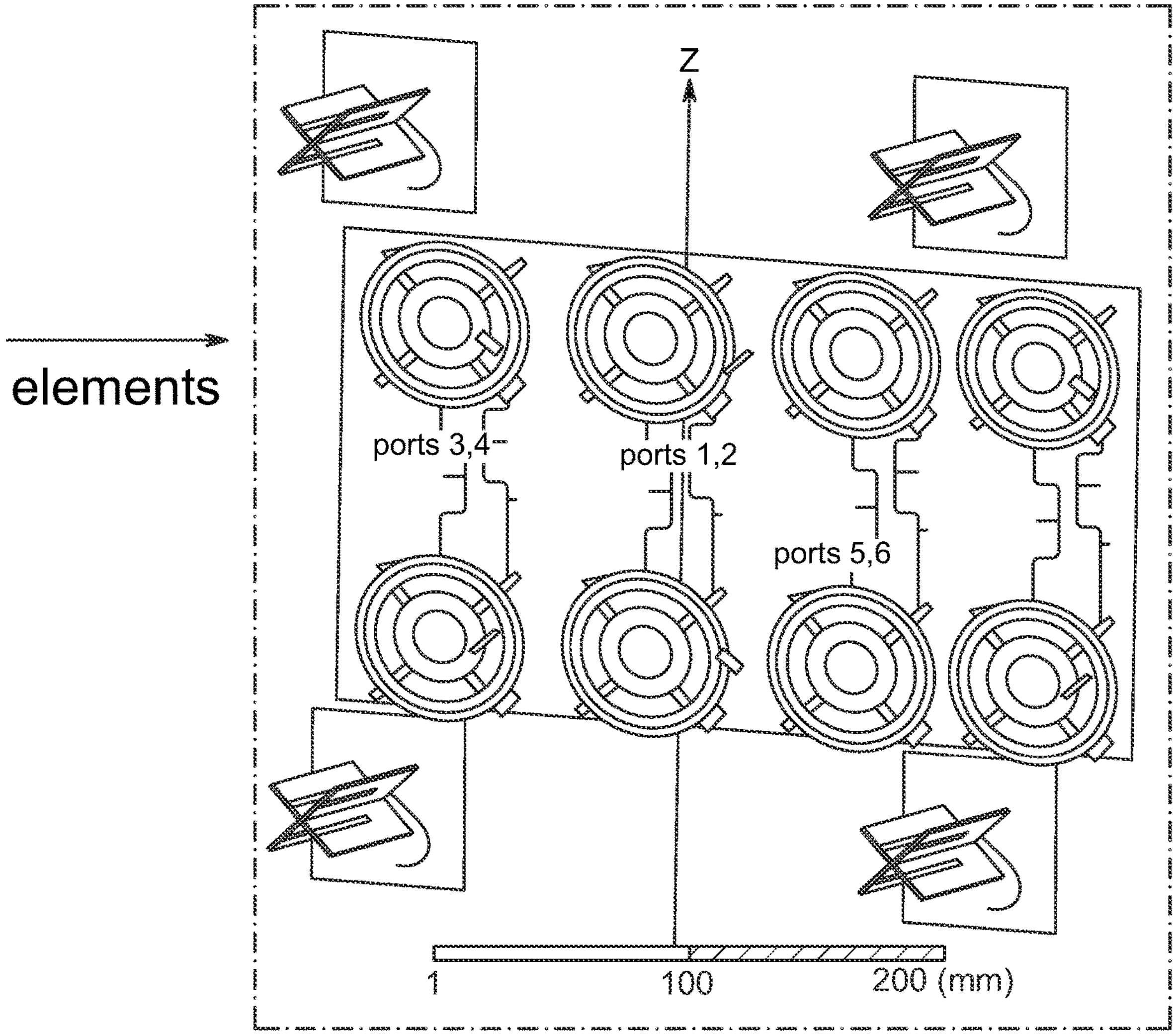
FIG. 9 shows a simulated set of mid band elements fed by six feed ports with dipoles from FIG. 2 (balun feed only) thereover.
Figure 10:
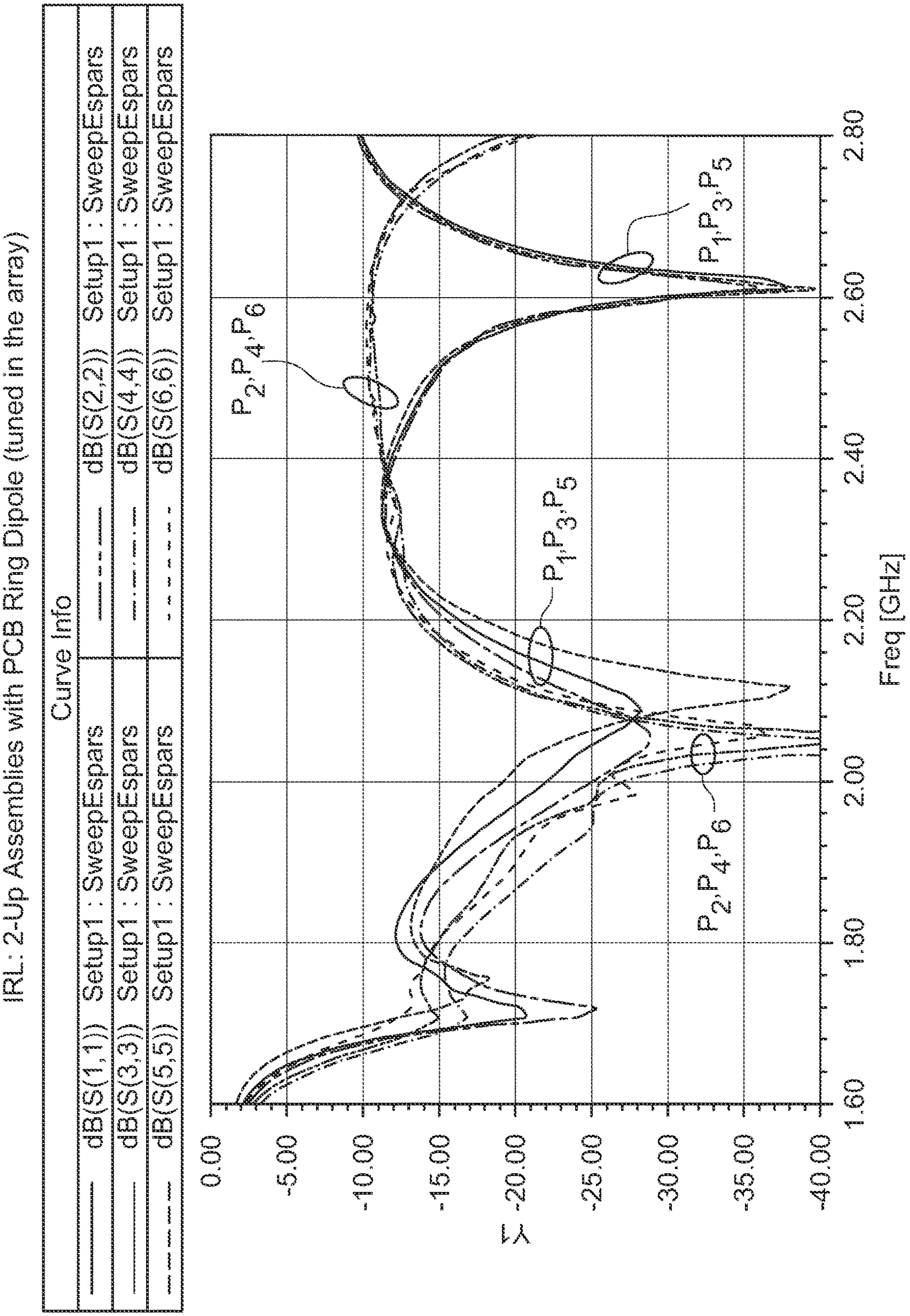
FIG. 10 shows a graph of return loss across the six ports from FIG. 9 in the range 1.6-2.8 GHz.
Figure 21:
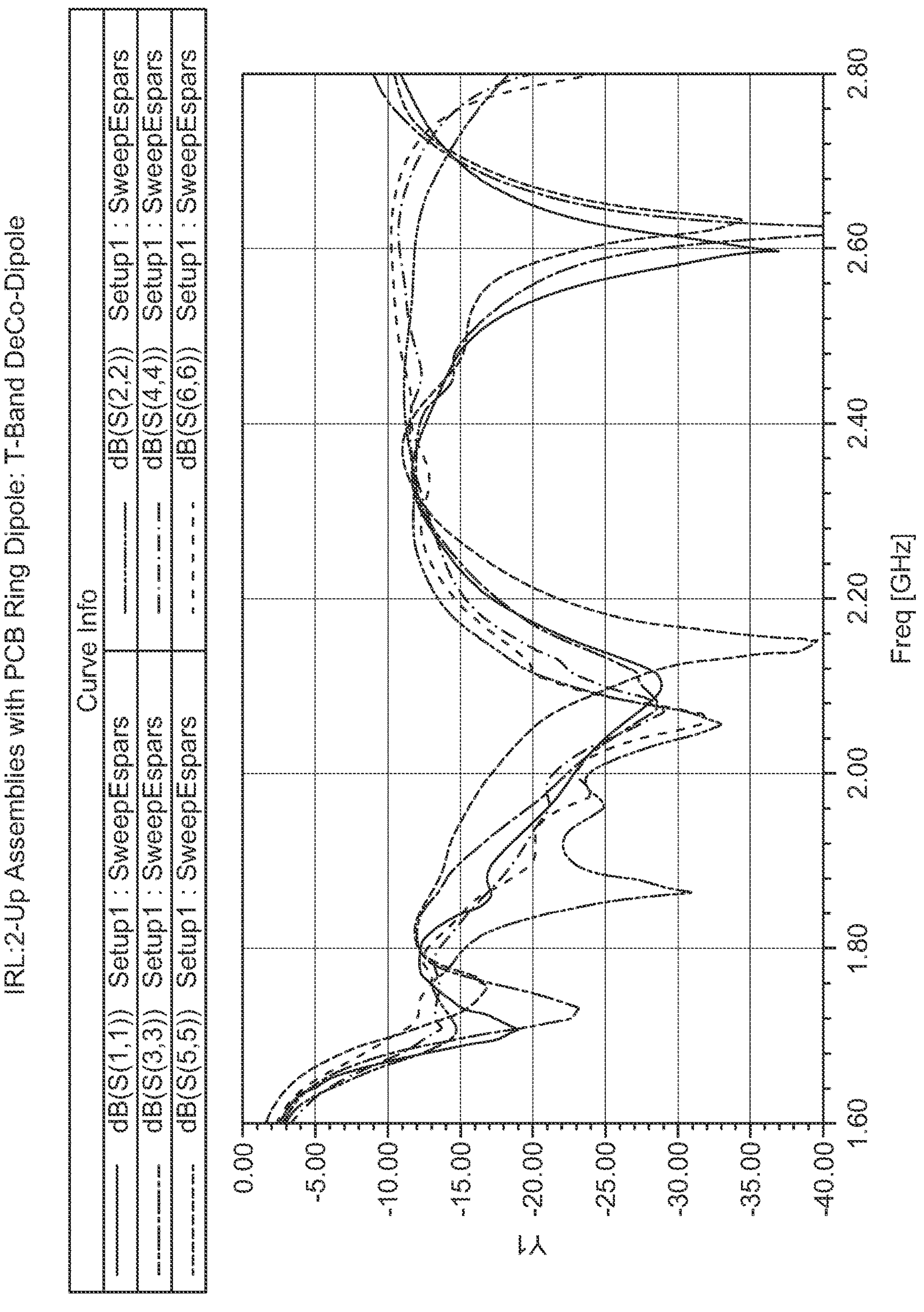
FIG. 21 shows a graph of return loss across the six ports from FIGS. 19/20 in the range 1.6-2.8 GHz.

The graph in FIG. 21 shows the return loss over an exemplary mid band frequency range of 1.6 GHz to 2.8 GHZ, at six ports (i.e., for six of the mid band dipole elements), demonstrating a near ideal return loss scenario for such mid band elements very similar to that shown in FIG. 5 except for minor variations.

While only certain features of the invention have been illustrated and described herein, many modifications, substitutions, changes or equivalents will now occur to those skilled in the art. It is therefore understood that this application is intended to cover all such modifications and changes that fall within the true spirit of the invention.

I claim:

1. A dipole antenna formed on a printed circuit board said printed circuit board having a vertical section and a horizontal section extending from the top portion of said vertical section, said dipole antenna comprising:

a balun element formed on said vertical section, on a first and a second copper layer of said printed circuit board;

a dipole arm formed on said horizontal section on said first and said second copper layer of said printed circuit board, said dipole arm having a first and a second branch, each branch extending horizontally in a direction opposite to the other branch, said first and second branch of said dipole arm having a corresponding first and second dipole copper strip formed on said first copper layer of said printed circuit board;

said horizontal section of said dipole arm having a first wider portion extending from the printed circuit board's vertical central axis equally in opposite directions along said horizontal axis, the first copper layer of said wider portion including a capacitive element conductive strip that is parallel to and electrically insulated from said first and second dipole copper strips, said horizontal section having a narrower portion extending along the dipole arms in both directions;

a capacitive plate attached to the end portion of said wider portion of said horizontal section on the same side as the second copper layer of said printed circuit board opposite said first copper layer of said printed circuit board, said capacitive plate having a rectangular bottom portion opposite said first and second dipole conductive strips defining a conductor overlap to form a capacitive element.

2. The dipole antenna in accordance with claim 1, wherein said balun element includes two vertical balun copper strips forming two copper strip branches that are extended to and along said horizontal section to form said dipole conductive strips.

3. The dipole antenna in accordance with claim 1, wherein said capacitive plate is coupled to said capacitive element conductive trip with a plated via hole.

4. The dipole element in accordance with claim 3, where in the capacitance of said capacitive element is defined as:

$$C=\varepsilon r^{*}\varepsilon o^{*}A/d\text{[Farads]}$$

Where

εr=relative permittivity of said printed circuit board material

εo=permittivity of a vacuum [F/m]

A=area of said conductor overlap d=is the thickness of said printed circuit board.

5. The dipole antenna in accordance with claim 4 wherein length L of capacitive element extending beyond said overlap area is varied based on return loss characteristics of any given antenna application.

6. A cross shaped dipole antenna formed on a printed circuit board having two dipole antennas attached in a cross shaped arrangement, each of said dipole antennas having said printed circuit board having a vertical section and a horizontal section extending from the top portion of said vertical section, each of said dipole antennas comprising:

a balun element formed on said vertical section, on a first and a second copper layer of said printed circuit board;

a dipole arm formed on said horizontal section on said first and said second copper layer of said printed circuit board, said dipole arm having a first and a second branch, each branch extending in a direction opposite to the other branch, said first and second branch of said dipole arm having a corresponding first and second dipole copper strip formed on said first copper layer of said printed circuit board;

said horizontal section having a first wider portion extending from the printed circuit board's vertical central axis equally in opposite directions along said horizontal axis, the first copper layer of said wider portion including a capacitive element conductive strip that is parallel to and electrically insulated from said first and second dipole copper strips, said horizontal section having a narrower portion extending along the dipole arms in both directions;

a capacitive plate attached to the end portion of said wider portion of said horizontal section on the same side as the second copper layer of said printed circuit board opposite said first copper layer of said printed circuit board, said capacitive plate having a rectangular bottom portion opposite said first and second dipole conductive strips defining a conductor overlap to form a capacitive element.

7. The dipole antenna in accordance with claim 6, wherein said balun element includes two vertical balun copper strips forming two copper strip branches that are extended to and along said horizontal section to form said dipole conductive strips.

8. The dipole antenna in accordance with claim 6, wherein said capacitive plate is coupled to said capacitive element conductive trip with a plated via hole.

9. The dipole element in accordance with claim 8, where in the capacitance of said capacitive element is defined as:

$$C=\varepsilon r^{*}\varepsilon o^{*}A/d\text{[Farads]}$$

Where

εr=relative permittivity of said printed circuit board material

εo=permittivity of a vacuum [F/m]

A=area of said conductor overlap d=is the thickness of said printed circuit board.

10. The dipole antenna in accordance with claim 9 wherein the length L of capacitive element extending beyond said overlap area is varied based on return loss characteristics of any given application.

11. An antenna array operating in a plurality of frequency bands characterized at least as low band and high band frequency bands wherein the range of frequency of said low band falls below the range of frequency of said high band, comprising:

a plurality of antenna elements placed on a reflector operating in said high frequency band;

a plurality of cross-shaped dipoles operating in said low frequency band each of said cross shaped dipole antennas formed on a printed circuit board having two dipole antennas attached in a cross shaped arrangement, each of said dipole antennas having said printed circuit board having a vertical section and a horizontal section extending from the top portion of said vertical section, each of said dipole antennas further comprising, a balun element formed on said vertical section, on a first and a second copper layer of said printed circuit board;

a dipole arm formed on said horizontal section on said first and said second copper layer of said printed circuit board, said dipole arm having a first and a second branch, each branch extending in a direction opposite to the other branch, said first and second branch of said dipole arm having a corresponding first and second dipole copper strip formed on said first copper layer of said printed circuit board;

said horizontal section having a first wider portion extending from the printed circuit board's vertical central axis equally in opposite directions along said horizontal axis, the first copper layer of said wider portion including a capacitive element conductive strip that is parallel to and electrically insulated from said first and second dipole copper strips, said horizontal section having a narrower portion extending along the dipole arms in both directions;

a capacitive plate attached to the end portion of said wider portion of said horizontal section on the same side as the second copper layer of said printed circuit board opposite said first copper layer of said printed circuit board, said capacitive plate having a rectangular bottom portion opposite said first and second dipole conductive strips defining a conductor overlap to form a capacitive element.

12. The dipole antenna in accordance with claim 11, wherein said balun element includes two vertical balun copper strips forming two copper strip branches that are extended to and along said horizontal section to form said dipole conductive strips.

13. The dipole antenna in accordance with claim 12, wherein said capacitive plate is coupled to said capacitive element conductive trip with a plated via hole.

14. The dipole element in accordance with claim 13, where in the capacitance of said capacitive element is defined as:

$$C=\varepsilon r^{*}\varepsilon o^{*}A/d\text{[Farads]}$$

Where

εr=relative permittivity of said printed circuit board material

εo=permittivity of a vacuum [F/m]

A=area of said conductor overlap d=is the thickness of said printed circuit board.

15. The dipole antenna in accordance with claim 14 wherein the length L of capacitive element extending beyond said overlap area is varied based on return loss characteristics of any given application.

16. An antenna array having a plurality of antenna elements operating in at least two separate frequency bands, wherein the range of the frequencies in the first low frequency band is lower than the range of frequencies in the second high frequency band, said antenna elements in the low frequency band each are a cross shaped dipole antenna formed on a printed circuit board said printed circuit board having a vertical section and a horizontal section extending from the top portion of said vertical section, each of said dipole antennas comprising:

a balun element formed on said vertical section, on a first and a second copper layer of said printed circuit board;

a dipole arm formed on said horizontal section on said first and said second copper layer of said printed circuit board, said dipole arm having a first and a second branch, each branch extending horizontally in a direction opposite to the other branch, said first and second branch of said dipole arm having a corresponding first and second dipole copper strip formed on said first copper layer of said printed circuit board;

said horizontal section of said dipole arm having a first wider portion extending from the printed circuit board's vertical central axis equally in opposite directions along said horizontal axis, the first copper layer of said wider portion including a capacitive element conductive strip that is parallel to and electrically insulated from said first and second dipole copper strips, said horizontal section having a narrower portion extending along the dipole arms in both directions;

a capacitive plate attached to the end portion of said wider portion of said horizontal section on the same side as the second copper layer of said printed circuit board opposite said first copper layer of said printed circuit board, said capacitive plate having a rectangular bottom portion opposite said first and second dipole conductive strips defining a conductor overlap to form a capacitive element.

17. The dipole antenna in accordance with claim 16, wherein said balun element includes two vertical balun copper strips forming two copper strip branches that are extended to and along said horizontal section to form said dipole conductive strips.

18. The dipole antenna in accordance with claim 17, wherein said capacitive plate is coupled to said capacitive element conductive trip with a plated via hole.

19. The dipole element in accordance with claim 18, where in the capacitance of said capacitive element is defined as:

$$C=\varepsilon r^{*}\varepsilon o^{*}A/d\text{[Farads]}$$

Where

εr=relative permittivity of said printed circuit board material

εo=permittivity of a vacuum [F/m]

A=area of said conductor overlap d=is the thickness of said printed circuit board.

20. The dipole antenna in accordance with claim 19 wherein length L of capacitive element extending beyond said overlap area is varied based on return loss characteristics of any given antenna application.

* * * * *